April 12, 1932.   E. H. SCHMIDT   1,853,932
FRICTION DRAFT GEAR
Filed July 24, 1926   3 Sheets-Sheet 1
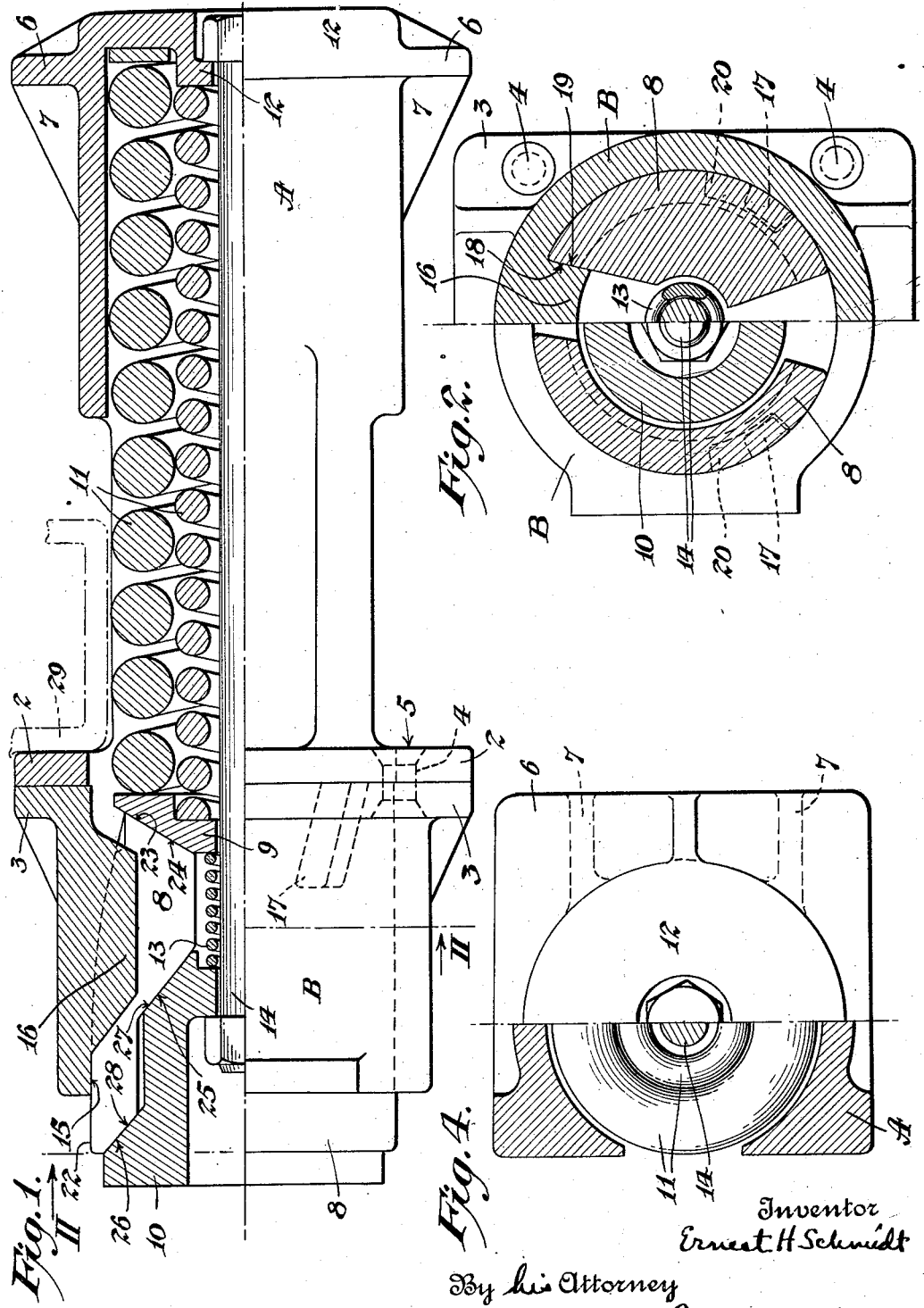

April 12, 1932. E. H. SCHMIDT 1,853,932
FRICTION DRAFT GEAR
Filed July 24, 1926 3 Sheets-Sheet 2
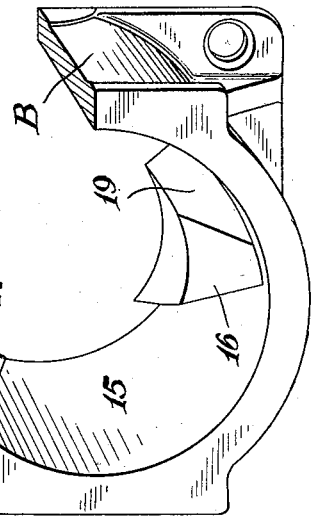
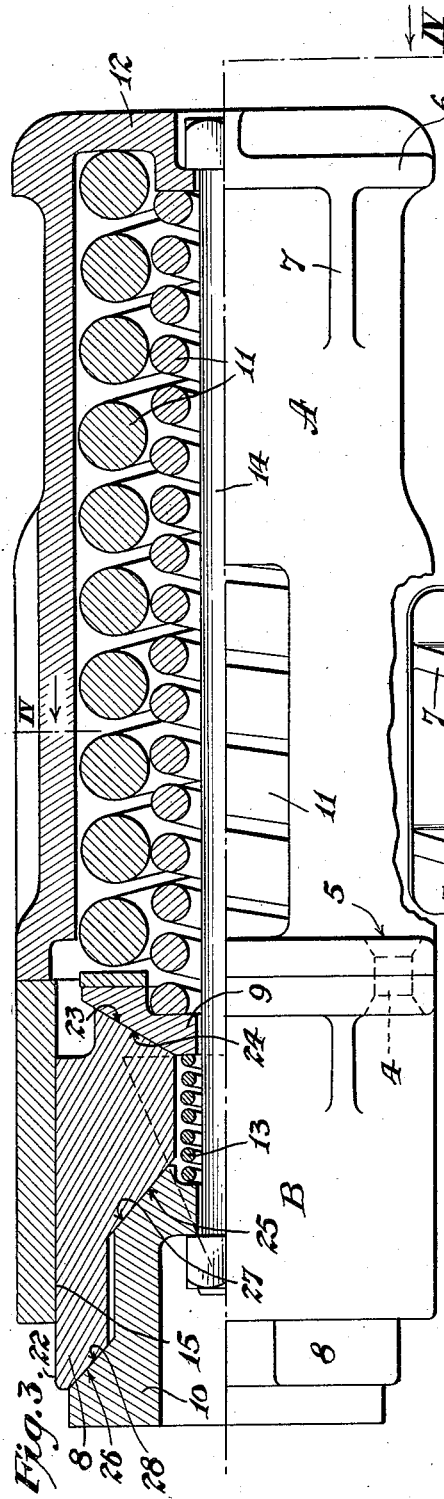
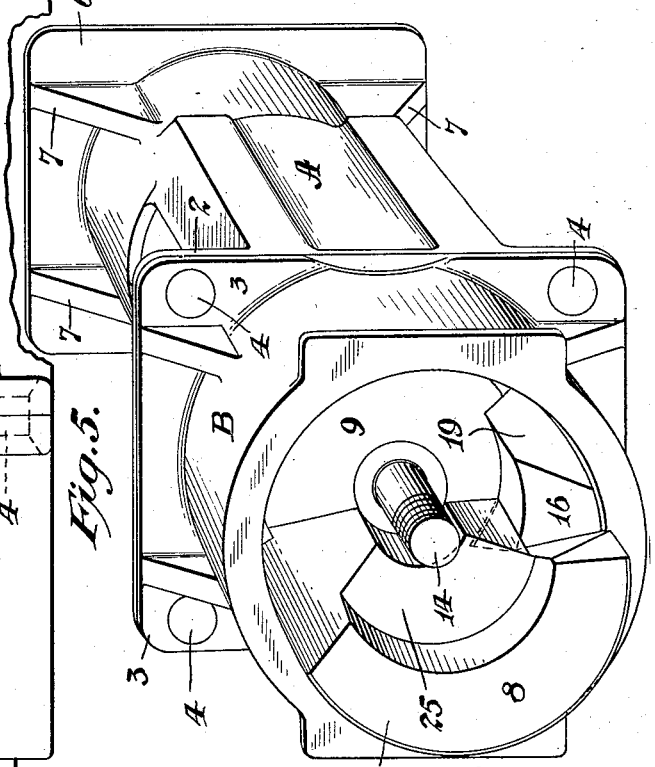
Inventor
Ernest H Schmidt
By his Attorney
Clarence Kerr April 12, 1932.     E. H. SCHMIDT     1,853,932
FRICTION DRAFT GEAR
Filed July 24, 1926     3 Sheets-Sheet 3
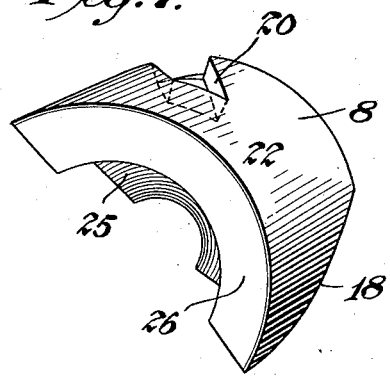
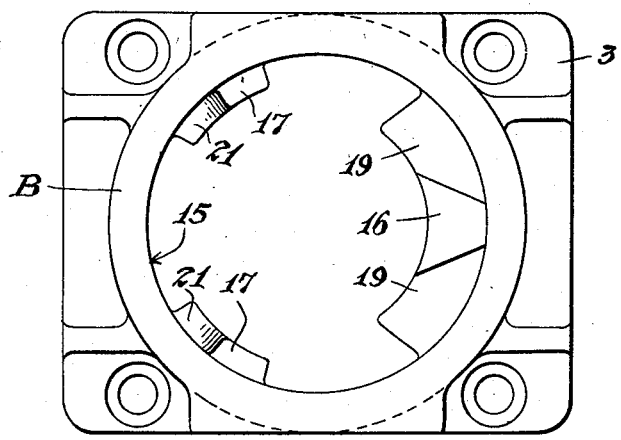
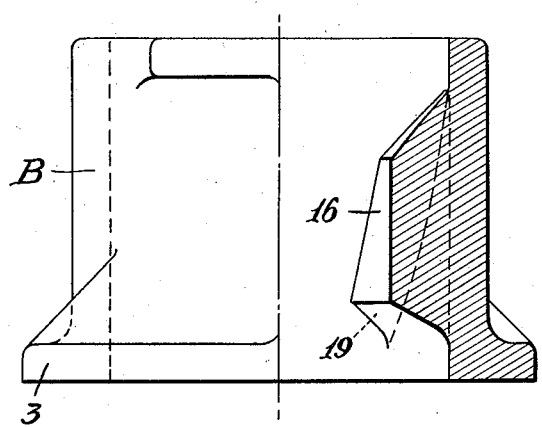
Inventor
Ernest H. Schmidt
By his Attorney
Clarence D. Kerr Patented Apr. 12, 1932

1,853,932

UNITED STATES PATENT OFFICE

ERNEST H. SCHMIDT, OF CLEVELAND HEIGHTS, OHIO, ASSIGNOR TO NATIONAL MALLEABLE AND STEEL CASTINGS COMPANY, OF CLEVELAND, OHIO, A CORPORATION OF OHIO

FRICTION DRAFT GEAR

Application filed July 24, 1926. Serial No. 124,560.

Fig. 1 is a plan, partly in section, of a friction draft gear embodying my invention; Fig. 2 is a section on line II—II of Fig. 1; Fig. 3 is a side elevation, partly in section; Fig. 4 is a section on line IV—IV of Fig. 3; Fig. 5 is a front end perspective of the gear with the friction wedge and one of the shoes removed; Fig. 6 is a perspective of the friction shell partly broken away; Fig. 7 is a perspective of one of the friction shoes; Fig. 8 is a front elevation of the friction shell; and Fig. 9 is a plan of the friction shell, partly in section.

My invention relates to friction draft gear and comprises a friction barrel or shell engaged by a plurality of friction shoes and containing means for causing the shoes during compression or release to rotate or have an angular movement relative to the longitudinal axis of the shell and thereby increase the frictional resistance, and distribute the wear more uniformly within the friction casing. My invention also comprises various other features which I shall hereinafter describe and claim.

Referring to the drawings, A indicates a spring case or shell having at its forward end outwardly extending flanges 2, which are engaged by corresponding flanges 3 on the friction case or shell B. The flanges 2 and 3 are held together by rivets 4, the heads of which are made flush with the flange 2, as is indicated at 5 in Fig. 1. At its rear end the spring case A is provided with wings 6 suitably reinforced with ribs 7 merging into the sides of the case A.

Within the friction chamber B are friction shoes 8 interposed between the spring seat 9 and the friction wedge 10. The spring case A carries one or more draft springs 11 which bear at one end against the spring seat 9 and at the other end against the base 12 of the spring case A. A small release spring 13 is also interposed between the spring seat 9 and the friction wedge 10. The parts are held in assembled relation by the retaining rod 14, which has a bearing on the wedge 10 and base 12.

The inside face 15 of the friction case or shell B may, if desired, be tapered inwardly toward its rear end, and is preferably provided with a compression lug 16 and a pair of release lugs 17. Cooperating with such inside face 15 and the lugs 16 and 17 are the friction shoes 8. These shoes 8 are formed with spirally shaped faces 18 which cooperate with the spiral faces 19 on the lug 16, and with a groove 20 cooperating with the spiral faces 21 on a release lug 17. While in the construction shown, the groove is shown in the friction shoe cooperable with lugs on the friction shell, it is to be understood that the grooves may, if desired, be located in the shell and the lugs formed on the friction shoe.

The outer circumferential surface 22 of a shoe 8 has a frictional bearing against the inner surface 15 of the friction shell B, while the rear surface 23 of a shoe bears against the forward face 24 of the spring seat 9, as is shown in Fig. 3. The face 24 may be of conical or any desired shape. The shoes 8 are further provided with wedging surfaces 25 and 26, which engage the correspondingly inclined wedging surfaces 27 and 28 of the friction wedge 10.

The operation of my improved gear is as follows:

When the gear is being compressed the friction wedge 10 is forced rearwardly with respect to the friction shell B, and this in turn moves the shoes rearwardly against the action of the springs 11 and against the friction between the surfaces 22 of the shoes and the inner face 15 of the shell B. As the shoes 8 move rearwardly, the spiral surfaces 19 on the lug 16 cause the shoes 8 to rotate in opposite directions, due to the guiding contact with the faces 18 of the shoes 8. This causes an additional frictional engagement between the lug 16 of the shell and the face 18 on the shoes. Further frictional resistance is also caused between the rear surfaces 23 of the shoes and the forward face 24 of the spring seat 9 by the rotation of the shoes. The shoes thus have five friction surfaces, 18, 22, 23, 25 and 26, which engage corresponding surfaces on the friction shell, wedge and spring seat. It will be seen that the rotation of the shoes in opposite directions serves to equalize the torsional forces and eliminates any tendency of the gear to rotate as a unit.

As the pressure abates the release spring 13, if used, causes a slight outward movement of the wedge. The spring or springs 11 then move the spring seat 9 and with it the shoes outwardly in a straight line until a surface in the groove 20 in the shoe engages a surface of the releasing lug 17. During their initial releasing movement, the shoes do not rotate because of the clearance between the groove and the lug 17, so as to prevent friction and thus provide an easy release. After this initial releasing action has taken place, the frictional adhesion between the parts is broken and the spring 11 easily restores the parts to their normal position. The release lugs 17 also serve to rotate the shoes in reverse direction, causing them to assume their initial position.

A further result of the clearance between the groove 20 in the shoes and the lug 17 is to allow the shoes when the gear is again compressed to move inwardly in a straight line, until the shoes contact the spiral surfaces 19. If desired, the clearance between one of the shoes and its guiding spiral may be made greater than that between the other shoe and its guiding spiral, thus causing one shoe to start rotation ahead of the other both during compression and release, and while the other is still moving in a straight line. The result of this is a graduated resistance during compression and a serial release.

The additional clearance also is of a further advantage in distributing the lines of wear, thus giving a somewhat smoother surface than would result from constant travel of the shoes back and forth along the same line.

One advantage in constructing the friction barrel separate from the spring case is that they may be made of different materials. Thus, for instance, the friction chamber may be made of wear resistant steel, and the spring case of malleable iron.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the inventions claimed.

What I claim is:

1. In a friction shock absorbing mechanism, a friction shell; friction shoes disposed in said shell in frictional engagement therewith; a wedge for moving said shoes longitudinally of said shell; and means arranged about the circumference of said shell for rotating the shoes in opposite directions about the longitudinal axis of said shell, said rotative means being effective during only a portion of the compression and release movements of the gear.

2. A friction shock absorbing mechanism comprising a friction shell having longitudinally arranged friction surfaces; shoes wedged into engagement with said friction surfaces by means of a central wedge member; and means for causing a spirally rotative frictional engagement of said shoes with said longitudinally arranged friction surfaces.

3. A friction shock absorbing mechanism comprising a cylindrical friction shell; friction shoes; a wedge having a conical wedging surface for engagement with said friction shoes to maintain them in frictional engagement with said shell; yieldable means for resisting movement of the shoes longitudinally of the shell; and means arranged about the circumference of said shell for rotating the shoes with respect to the wedge.

4. A friction shock absorbing mechanism comprising a friction shell; friction shoes; a central wedge member arranged to maintain the friction shoes in frictional engagement with said shell and to move them longitudinally with respect thereto upon compression of the mechanism; yieldable means for resisting said movement of the shoes and guiding means on the shell for causing rotative movement of the shoes, the longitudinal movement of each shoe being in the same direction and the rotative movement of the shoes being in opposite directions.

5. In a friction shock absorbing mechanism, a friction shell, friction shoes disposed in said shell in frictional engagement therewith, a wedge arranged to move the shoes in the same longitudinal direction relative to the shell, yieldable means for resisting said movement of the shoes, and means arranged about the circumference of the shell and in fixed relation thereto for rotating the shoes in opposite directions about the longitudinal axis of said shell.

6. A shock absorbing mechanism comprising a friction casing, friction shoes therein, a wedge maintaining said friction shoes in frictional engagement with the casing, the contiguous surfaces of said casing and shoes having cooperating spiral ribs and grooves for causing the shoes to rotate with respect to the wedge as they move longitudinally with it, and a compression spring arranged to oppose the longitudinal movement of the shoes.

7. A friction shock absorbing mechanism comprising a friction casing, friction shoes, the casing having circumferential friction faces engaged by corresponding arc-shaped faces on the shoes, each shoe having adjacent its arc-shaped face at a distance from the edges thereof a spiral friction surface cooperating with a corresponding spiral friction surface on the casing for rotating said shoe, a wedge for maintaining the friction shoes in frictional engagement with the casing, and for moving them longitudinally relative to it, and a compression spring arranged to oppose the longitudinal movement of the shoes.

8. In a shock absorber structure, a hollow friction member, friction shoe members having frictional engagement with the inner surface of the hollow friction member, interengaging spiral lugs and grooves on the contiguous surfaces of said hollow friction member and said friction shoe members, and a wedging member having telescopic relation to said friction shoe members and arranged under pressure of the load to force said friction shoe members radially outward to exert pressure against the surfaces of the hollow friction member with which they are in contact.

ERNEST H. SCHMIDT.